United States Patent
Dunjic et al.

(10) Patent No.: US 11,128,614 B2
(45) Date of Patent: Sep. 21, 2021

(54) ESTABLISHING A TRUSTED SESSION WITH A SMART SPEAKER

(71) Applicant: The Toronto-Dominion Bank, Toronto (CA)

(72) Inventors: Milos Dunjic, Oakville, CA (US); Vipul Kishore Lalka, Oakville, CA (US)

(73) Assignee: The Toronto-Dominion Bank, Waterloo (CA)

(*) Notice: Subject to any disclaimer, the term of this patent is extended or adjusted under 35 U.S.C. 154(b) by 231 days.

(21) Appl. No.: 16/506,312

(22) Filed: Jul. 9, 2019

(65) Prior Publication Data
US 2020/0382486 A1  Dec. 3, 2020

Related U.S. Application Data

(60) Provisional application No. 62/853,117, filed on May 27, 2019.

(51) Int. Cl.
| | |
|---|---|
| *H04L 29/06* | (2006.01) |
| *H04L 9/32* | (2006.01) |
| *H04W 12/06* | (2021.01) |
| *H04L 9/06* | (2006.01) |

(52) U.S. Cl.
CPC .......... *H04L 63/083* (2013.01); *H04L 9/0625* (2013.01); *H04L 9/3226* (2013.01); *H04W 12/06* (2013.01)

(58) Field of Classification Search
CPC ... H04L 63/083; H04L 9/3226; H04L 9/0625; H04L 2209/80; H04L 9/3213; H04L 63/18; H04W 12/06; H04W 12/069; H04W 12/0471; H04W 12/041; H04W 12/50; H04W 12/65
See application file for complete search history.

(56) References Cited

U.S. PATENT DOCUMENTS

| | | | |
|---|---|---|---|
| 10,063,542 B1* | 8/2018 | Kao | G10L 17/24 |
| 10,741,180 B1* | 8/2020 | Gella | G10L 15/183 |
| 2015/0089569 A1* | 3/2015 | Sondhi | H04L 63/0807 726/1 |
| 2015/0215299 A1* | 7/2015 | Burch | H04L 63/18 726/5 |
| 2019/0132321 A1* | 5/2019 | Pitchaimani | H04W 12/06 |
| 2020/0034521 A1* | 1/2020 | Teng | G10L 19/018 |

* cited by examiner

*Primary Examiner* — Baotran N To
(74) *Attorney, Agent, or Firm* — Rowand LLP

(57) ABSTRACT

A trusted session is to be established between a smart speaker and a computer server. The computer server may receive an instruction to initiate a trusted session with the smart speaker. The instruction includes an indication of an account linking token for linking a first and second account associated with the smart speaker and the computer server, respectively. The computer server generates a session token and sends it to the smart speaker for acoustic signalling. The acoustic signal is captured by a mobile device and used to reconstruct the session token. The computer server receives the reconstructed session token along with identifying information from the mobile device. The computer server system uses the identifying information to confirm that the mobile device is associated with the second accord. Upon so confirming, the computer server may establish a trusted session between the first smart speaker and the computer server system.

20 Claims, 5 Drawing Sheets

ESTABLISHING A TRUSTED SESSION WITH A SMART SPEAKER

CROSS-REFERENCE TO RELATED APPLICATION

The present application claims priority to U.S. Patent Application No. 62/853,117 entitled "TRUSTED SESSION ESTABLISHMENT WITH VOICE ASSISTANTS" filed May 27, 2019, the contents of which are herein incorporated by reference in their entirety.

TECHNICAL FIELD

This relates to authorization and authentication, and, more particularly, to establishing trusted sessions between smart speakers and remote servers.

BACKGROUND

Smart speakers such as, for example, the Amazon™ Echo™ and the Google™ Home™, provide interactive voice assistants that can respond to voice queries from users and undertake tasks responsive to such voice queries.

Smart speakers may allow third-parties to provide software to expand the capability of their voice assistants. For example, the Amazon Echo can be expanded with software plug-ins Amazon refers to as Alexa Skills and the Google Home can be expanded with similar plug-ins called Google Assistant Actions.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
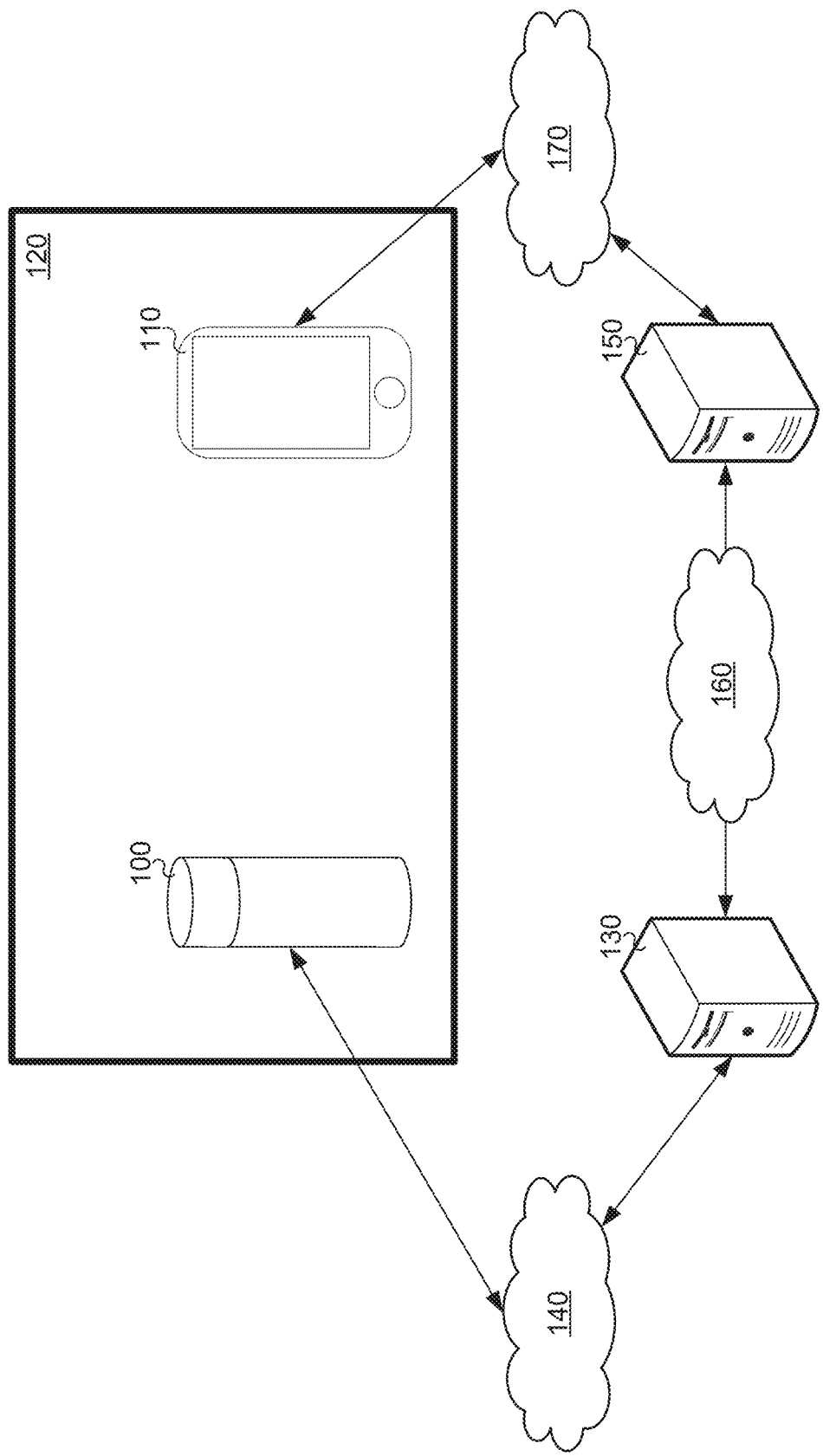
FIG. 1 is a schematic operation diagram illustrating an operating environment of an example embodiment including an electronic device, a mobile computing device, and a first and second computer server system.

According to the subject matter of the present application, there may be provided a computer server system. The computer server system may include a processor, a communications module, and a memory. The communications module and the memory may be coupled to the processor. The memory may store instructions that, when executed by the processor, cause the computer server system to: receive, using the communications module, an instruction to initiate a trusted session between a first electronic device and the computer server system, the instruction including an indication of an account linking token. The account linking token may be for linking a first account associated with the first electronic device with a second account associated with the computer server system. The instructions, when executed by the processor, may further cause the computer server system to: generate, by the processor using at least one of a pseudorandom source and a random source, a session token; send, to the first electronic device using the communications module, an indication of at least a portion of the session token. The first electronic device may be configured to acoustically signal the at least a portion of the session token. The instructions, when executed by the processor, may further cause the computer server system to: receive, by the computer server system using the communications module from a mobile computing device physically proximate the first electronic device, an indication based on identifying information for the mobile computing device and on the session token as reconstructed by the mobile computing device based on an acoustic signal of the at least a portion of the session token as signalled by the first electronic device by the first electronic device and captured by the mobile computing device. Responsive to receiving the indication of the identifying information for the mobile computing device and of the session token as reconstructed by the mobile computing device, the computer server system may confirm, by the processor, that the indication corresponds to the session token and to a mobile computing device associated with the second account. Responsive to confirming that the indication corresponds to the session token and to a mobile computing device associated with the second account, the computer server system may establish a trusted session between the first electronic device and the computer server system.

In some implementations, the session token may be divided into a first portion and a second portion. The at least a portion of the session token may be the first portion of the session token. In some such implementations, the instructions, when executed by the processor, may further cause the computer server system to: send, to the mobile computing device using the communications module, an indication of the second portion of the session token. It may be that the mobile computing device reconstructs the session token by combining the second portion of the session token with at least a portion of the session token as reconstructed by the mobile computing device to yield the session token.

In some implementations, the at least a portion of the session token sent to the first electronic device may include the entirety of the session token.

In some implementations, the indication based on identifying information for the mobile computing device and on the session token as reconstructed by the mobile computing device may include an authentication cryptogram generated by the mobile computing device based on the session token as reconstructed by the mobile computing device and the identifying information for the mobile computing device. It may be that confirming that the indication corresponds to the session token and to a mobile computing device associated with the second account includes verifying the authentication cryptogram. For example, it may be that the authentication cryptogram is generated and verified using a pre-determined encryption algorithm and based on a pre-determined encryption key, and that the pre-determined encryption key is associated with the account linking token, and that confirming, by the computer server system, that the indication corresponds to the session token and to a mobile computing device associated with the second account further includes identifying the pre-determined encryption key based on the account linking token. The pre-determined encryption algorithm may be 3 DES.

In some implementations, the at least a portion of the session token may be acoustically signalled by the first electronic device ultrasonically.

In some implementation, the indication of at least a portion of the session token may include an encoded audio signal indicating the at least a portion of the session token.

According to the subject matter of the present application, there may be provided a computer-implemented method. The method may include receiving, by a computer server system, an instruction to initiate a trusted session between a first electronic device and the computer server system. The instruction may include an indication of an account linking token. The account linking token may be for linking a first account associated with the first electronic device with a second account associated with the computer server system. The method may further include generating, by the computer server system using at least one of a pseudorandom source and a random source, a session token; and sending, by the computer server system to the first electronic device, an indication of at least a portion of the session token. The first electronic device may be configured to acoustically signal the at least a portion of the session token. The method may further include receiving, by the computer server system from a mobile computing device physically proximate the first electronic device, an indication based on identifying information for the mobile computing device and on the session token as reconstructed by the mobile computing device based on an acoustic signal of the at least a portion of the session token as signalled by the first electronic device and captured by the mobile computing device; responsive to receiving the indication of the identifying information for the mobile computing device and of the session token as reconstructed by the mobile computing device, confirming, by the computer server system, that the indication corresponds to the session token and to a mobile computing device associated with the second account; and responsive to confirming that the indication corresponds to the session token and to a mobile computing device associated with the second account, establishing a trusted session between the first electronic device and the computer server system.

In some implementations, the session token may be divided into a first portion and a second portion. The at least a portion of the session token may be the first portion of the session token. In some such implementations, the method may further include: sending, by the computer server system to the mobile computing device, an indication of the second portion of the session token. The mobile computing device may reconstruct the session token by combining the second portion of the session token with at least a portion of the session token as reconstructed by the mobile computing device to yield the session token.

In some implementations, the at least a portion of the session token sent to the first electronic device may include the entirety of the session token.

In some implementations, the indication based on identifying information for the mobile computing device and on the session token as reconstructed by the mobile computing device may include an authentication cryptogram generated by the mobile computing device based on the session token as reconstructed by the mobile computing device and the identifying information for the mobile computing device. It may be that confirming, by the computer server system, that the indication corresponds to the session token and to a mobile computing device associated with the second account includes verifying the authentication cryptogram. For example, it may be that the authentication cryptogram is generated and verified using a pre-determined encryption algorithm and based on a pre-determined encryption key, and that the pre-determined encryption key is associated with the account linking token, and that confirming, by the computer server system, that the indication corresponds to the session token and to a mobile computing device associated with the second account further includes identifying, by the computer server system, the pre-determined encryption key based on the account linking token. The pre-determined encryption algorithm may be 3 DES.

In some implementations, the at least a portion of the session token may be acoustically signalled by the first electronic device ultrasonically.

In some implementations, the indication of at least a portion of the session token may include an encoded audio signal indicating the at least a portion of the session token.

According to the subject matter of the present application, there may be provided a computer-readable medium. The computer-readable medium may be a non-transitory computer-readable medium. The computer-readable medium may store instructions that, when executed by a processor of a computer system, cause the computer system to: receive an instruction to initiate a trusted session between a first electronic device and the computer-readable medium, the instruction including an indication of an account linking token, the account linking token for linking a first account associated with the first electronic device with a second account associated with the computer system; generate, using at least one of a pseudorandom source and a random source, a session token; and send, to the first electronic device, an indication of at least a portion of the session token. The first electronic device may be configured to acoustically signal the at least a portion of the session token. The instructions, when executed, may further cause the computer system to: receive, by the computer system from a mobile computing device physically proximate the first electronic device, an indication based on identifying information for the mobile computing device and on the session token as reconstructed by the mobile computing device based on an acoustic signal of the at least a portion of the session token as signalled by the first electronic device and captured by the mobile computing device; responsive to receiving the indication of the identifying information for the mobile computing device and of the session token as reconstructed by the mobile computing device, confirm that the indication corresponds to the session token and to a mobile computing device associated with the second account; and responsive to confirming that the indication corresponds to the session token and to a mobile computing device associated with the second account, establish a trusted session between the first electronic device and the computer system.

In some implementations, the session token may be divided into a first portion and a second portion. The at least a portion of the session token may be the first portion of the session token. In some such implementations, the instructions, when executed by the processor, may further cause the computer system to: send, to the mobile computing device, an indication of the second portion of the session token, The mobile computing device may reconstruct the session token by combining the second portion of the session token with at least a portion of the session token as reconstructed to yield the session token.

In some implementations, the at least a portion of the session token sent to the first electronic device may include the entirety of the session token.

In some implementations, the indication based on identifying information for the mobile computing device and on the session token as reconstructed by the mobile computing device may include an authentication cryptogram generated by the mobile computing device based on the session token as reconstructed by the mobile computing device and the identifying information for the mobile computing device. It may be that confirming that the indication corresponds to the session token and to a mobile computing device associated with the second account includes verifying the authentication cryptogram.

According to the subject matter of the present application, there may be provided a computer-implemented method. The method may include sending, by a first electronic device to a first remote server, an indication of a signal corresponding to a request to initiate a trusted session between the first electronic device and a second remote server; receiving, by the first remote server from the first electronic device, the indication of the signal corresponding to the request to initiate the trusted session between the first electronic device and the second remote server; responsive to the indication of the signal corresponding to the request to initiate the trusted session between the first electronic device and the second remote server, sending by the first remote server to a second remote server, an instruction to initiate a trusted session between the first electronic device and the second remote server, the instruction including an indication of an account linking token, the account linking token for linking a first account associated with the first remote server with a second account associated with the second remote server; receiving, by the second remote server from the first remote server, the instruction to initiate a trusted session between the first electronic device and the second remote server; responsive to the instruction to initiate a trusted session between the first electronic device and the second remote server, generating, by the second remote server using at least one of a pseudo-random source and a random source, a session token; sending, by the second remote server to the first electronic device, an indication of at least a portion of the session token; receiving, by the first electronic device from the second remote server, the indication of at least a portion of the session token; acoustically signalling, by the first electronic device, the at least a portion of the session token; capturing, by a mobile computing device proximate the first electronic device, an acoustic signal of the at least a portion of the session token as signalled by the first electronic device; extracting, by the mobile computing device from the captured acoustic signal, the at least a portion of the session token; reconstructing, by the mobile computing device, the session token based on at least the at least a portion of the session token as extracted; sending, by the mobile computing device to the second remote server, an indication based on identifying information for the mobile computing device and on the session token as reconstructed by the mobile computing device; receiving, by the second remote server from the mobile computing device, the indication based on identifying information for the mobile computing device and on the session token as reconstructed by the mobile computing device; responsive to receiving the indication of the identifying information for the mobile computing device and of the session token as reconstructed by the mobile computing device, confirming, by the second remote server, that the indication corresponds to the session token and to a mobile computing device associated with the second account; and responsive to confirming that the indication corresponds to the session token and to a mobile computing device associated with the second account, establishing the trusted session between the first electronic device and the second remote server.

In some implementations, the session token may be divided into a first portion and a second portion. The at least a portion of the session token may be the first portion of the session token. In some such implementations, the method may further include: sending, by the second remote server to the mobile computing device, an indication of the second portion of the session token; and receiving, by the mobile computing device, the indication of the second portion of the session token. It may be that reconstructing, by the mobile computing device, the session token based on at least the at least a portion of the session token as extracted includes combining the at least a portion of the session token as extracted with the second portion of the session token to yield the session token.

In some implementations, the at least a portion of the session token sent to the first electronic device may include the entirety of the session token.

In some implementations, sending, by the mobile computing device to the second remote server, the indication based on identifying information for the mobile computing device and on the session token as reconstructed by the mobile computing device may include: generating, by the mobile computing device, based on the session token as reconstructed by the mobile computing device and the identifying information for the mobile computing device, an authentication cryptogram; and sending, by the mobile computing device, the authentication cryptogram to the second remote server. It may be that confirming, by the second remote server, that the indication corresponds to the session token and to a mobile computing device associated with the second account includes verifying the authentication cryptogram. The authentication cryptogram may, for example, be generated and verified using a pre-determined encryption algorithm and based on a pre-determined encryption key. The pre-determined encryption key may be associated with the account linking token. Confirming, by the second remote server, that the indication corresponds to the session token and to a mobile computing device associated with the second account further may include identifying, by the second remote server, the pre-determined encryption key based on the account linking token. The pre-determined encryption algorithm may be 3DES.

In some implementations, the at least a portion of the session token may be acoustically signalled by the first electronic device ultrasonically.

In some implementations, the indication of at least a portion of the session token may be sent by the second remote server to the first electronic device via the first remote server.

In some implementations, the indication of at least a portion of the session token may include an encoded audio signal indicating the at least a portion of the session token.

In some implementations, the first electronic device may be a smart speaker. The signal corresponding to the request to initiate a trusted session between the first electronic device and a second remote server may correspond to a spoken utterance requesting initiation of a trusted session between the first electronic device and a second remote server.

According to the subject matter of the present application, there may be provided a computer server system. The computer server system may include a processor and a memory. The memory may be coupled to the processor. The memory may store instructions that, when executed by the processor, cause the computer server system to perform the above-described method.

According to the subject matter of the present application, there may be provided a computer-readable medium. The computer-readable medium may be a non-transitory computer-readable medium. The computer-readable medium may store instructions that, when executed by a processor of a computer system, cause the computer system to perform the above-described method.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, an electronic device 100 and a mobile computing device 110 are disposed in an environment 120. The electronic device 100 and the mobile computing device 110 are physically proximate.

The electronic device 100 can communicate with a first server computer system 130 via a network 140 and vice-versa. The first server computer system 130 may, as shown, be remote from the environment 120, the electronic device 100, and/or the mobile computing device 110.

The first server computer system 130 can communicate with a second server computer system 150 via a network 160 and vice-versa. The second server computer system 150 may, as shown, be remote from the environment 120. Further, the second server computer system 150 may be remote from the first server computer system 130.

The second server computer system 150 can communicate with the mobile computing device 110 via a network 170 and vice-versa. The second server computer system 150 may, as shown, be remote from the environment 120, the mobile computing device 110 and/or the electronic device 100.

The electronic device 100 is a computing device. The electronic device 100 may, as shown, be a smart speaker. For example, the electronic device 100 may be a Google Home speaker or an Amazon Echo. The electronic device 100 may include one or more microphones for capturing acoustic signals (sounds) from the environment proximate the electronic device 100 (i.e., the environment 120) and one or more speakers for providing acoustic signals to the environment proximate the electronic device 100. Additionally or alternatively, the electronic device 100 may include one or more other components such as, for example, a hardware processor. The electronic device 100 may be adapted to provide a voice assistant. A user may interact with the electronic device 100 by providing voice utterances and the electronic device 100 may provide acoustic signals responsive to those spoken utterances. In this way, the electronic device 100 may be used to complete or one or more tasks and/or to access one or more services such as may, for example, be performed and/or provided via a voice assistant provided by the electronic device 100.

The mobile computing device 110 is a computer system. The mobile computing device 110 may, for example, be a smartphone as shown. In another example, the mobile computing device 110 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), and any other type of computing device that may be configured to store data and software instructions, and execute software instructions to perform operations consistent with disclosed embodiments. As further discussed below, the mobile computing device 110 includes means for providing signals to the environment 120 such as, for example, one or more speakers. The mobile computing device 110 also include means for capturing audio from the environment proximate the mobile computing device 110 (i.e., the environment 120) such as, for example, one or more microphones.

The first server computer system 130 may be or may include one or more computing devices. The first server computer system 130 may have a trust relationship with the electronic device 100. More specifically, the electronic device 100 may trust the first server computer system 130 and/or the first server computer system 130 may trust the electronic device 100. For example, it may be that an account links the electronic device 100 and the first server computer system 130 and that the first server computer system 130 trusts the electronic device 100 because it has authenticated with the first server computer system 130 relative to that account. The account may, for example, be a Google Account where the electronic device is a Google Home speaker. In another example, the account may be an Amazon account where the electronic device is an Amazon Echo. The first server computer system 130 may service the electronic device 100 such as, for example, by providing a natural language processing service utilized by a voice assistant provided by the electronic device 100. In providing such a service and/or other services, the first server computer system 130 may perform one or more functions responsive to input received from the electronic device 100. Such functions may, as further described below, include determining one or more intents associated with input (e.g., utterances) received from the electronic device 100 via the network 140. Additionally or alternatively, such functions may, as also further described below, include communicating with the second server computer system 150.

The second server computer system 150 may be or may include one or more computing devices. The second server computer system 150 may have a trust relationship with the mobile computing device 110. More specifically, the mobile computing device 110 may trust the second server computer system 150 and/or the second server computer system 150 may trust the mobile computing device 110. For example, it may be that one or both of the mobile computing device 110 and the second server computer system 150 has authenticated with the other of the mobile computing device 110 and the second server computer system 150 giving rise to or in support of a trust relationship therebetween.

The first server computer system 130 and the second server computer system 150 are computer server systems. A computer server system may, for example, be a mainframe computer, a minicomputer, or the like. In some a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 140, the network 160, and the network 170 are computer networks. In some embodiments, one or more of the network 140, the network 160, and the network 170 may be the same network as one or more others of the network 140, the network 160, and the network 170. A computer network may be an internetwork such as may be formed of one or more interconnected computer networks. For example, a computer network may be or may include an Ethernet network, an asynchronous transfer mode (ATM) network, a wireless network, and/or the like. Additionally or alternatively, one or more devices may communicate with the computer network by way of a plain-old telephone service (POTS) line such as using a modem. In a particular example, one or more of the network 140, the network 160, and the network 170 may be the Internet.

Notably, the second server computer system 150 does not initially have a trust relationship with the electronic device 100. As further described below, such a trust relationship may be established according to the subject matter of the present application.

Figure 2:
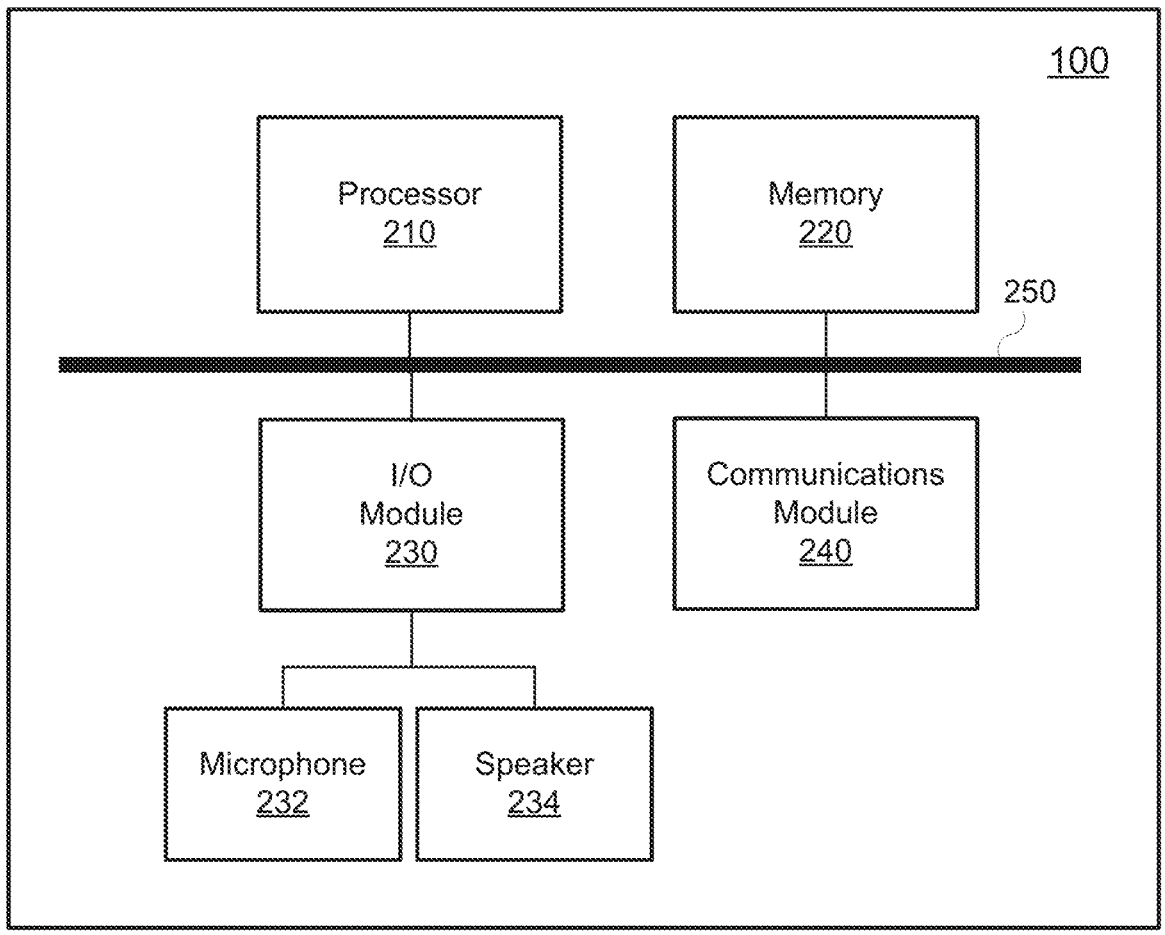
FIG. 2 is a high-level operation diagram of the electronic device of FIG. 1.

Components of an example embodiment of the electronic device 100 will now be discussed with regard to FIG. 2 which provides a high-level operation diagram thereof.

The electronic device 100 includes a variety of modules. For example, as illustrated, the electronic device 100 may include a processor 210, a memory 220, a communications module 240, and/or a communications module 240. As illustrated, the foregoing example modules of the electronic device 100 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the electronic device 100.

The I/O module 230 is an input module and an output module. As an input module, the I/O module 230 allows the electronic device 100 to receive input from components of the electronic device 100. As an output module, the I/O module 230 allows the electronic device 100 to provide output to components of the electronic device 100. For example, the I/O module 230 may, as illustrated, be in communication with a microphone 232 and a speaker 234. The microphone 232 may include one or more microphones such as may, for example, form a microphone array. The microphone 232 may be employed for capturing acoustic signals from the environment proximate the electronic device 100 as discussed above. The speaker 234 may include one or more speakers for providing acoustic signals to the environment proximate the electronic device 100 as discussed above. In summary, the I/O module 230 may allow the electronic device 100 to provide output via a speaker 234 and to receive input via a microphone 232.

The communications module 240 allows the electronic device 100 to communicate with other computing devices and/or various communications networks such as, for example, the network 140. The communications module 240 may allow the electronic device 100 to send or receive communications signals. Communications signals may be sent or received according to one or more protocols or according to one or more standards. For example, the communications module 240 may allow the electronic device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the electronic device 100 to communicate via Wi-Fi™, using Bluetooth™ or via some combination of one or more networks or protocols. In some embodiments, all or a portion of the communications module 240 may be integrated into a component of the electronic device 100. For example, the communications module 240 may be integrated into a communications chipset.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220. Such software may, for example, adapt the electronic device 100 to serve as a smart speaker such as, for example, to provide voice assistant services.

Figure 3:
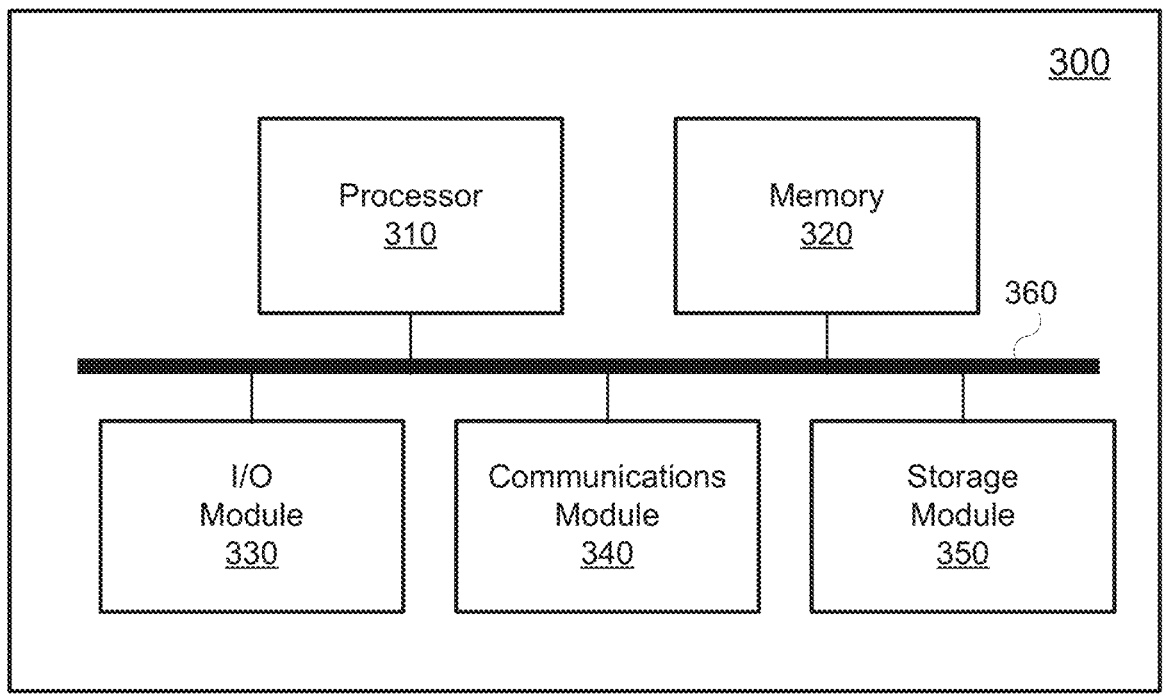
FIG. 3 depicts a high-level operation diagram of an example computer system.

Components of an example computing device 300 will now be discussed with regard to FIG. 3. In some embodiments, one or more instances of the example computing device 300 may serve as the first server computer system 130 the second server computer system 150 and/or the mobile computing device 110.

The example computing device 300 includes a variety of modules. For example, as illustrated, the example computing device 300 may include a processor 310, a memory 320, an I/O module 330, a communications module 340, and/or a storage module 350. As illustrated, the foregoing example modules of the example computing device 300 are in communication over a bus 360.

The processor 310 is a hardware processor. The processor 310 is akin to the processor 210 (FIG. 2) of the electronic device 100. The processor 310 may, for example, be one or more ARM, Intel x86, PowerPC processors or the like.

The memory 320 allows data to be stored and retrieved. The memory 320 is akin to the memory 220 (FIG. 2) of the electronic device 100 and performs similar functions and has similar features thereto.

The I/O module 330 is an input module and an output module. The I/O module is akin to the I/O module 230 (FIG. 2) of the electronic device 100 and performs similar functions and has similar features thereto. In some embodiments such as, for example, potentially where the example computing device 300 corresponds to the mobile computing device 110, the I/O module 330 may allow the mobile computing device 110 to provide output to and/or receive input from a display thereof. Further, in some such instances, the mobile computing device 110 may, additionally or alternatively, employ the I/O module 330 in providing acoustic signal output via one or more speakers and/or in receiving acoustic signal input via one or more microphones.

The communications module 340 allows the example computing device 300 to communicate with other computing devices and/or various communications networks, such as, for example, one or more of the network 140, the network 160, and/or the network 170. The communications module 340 is akin to the communications module 240 (FIG. 2) of the electronic device 100 and performs similar functions and has similar features thereto.

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in/from a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 340. In some embodiments, the storage module 350 may be omitted and its function may be performed by the memory 320 and/or by the processor 310 in concert with the communications module 340 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
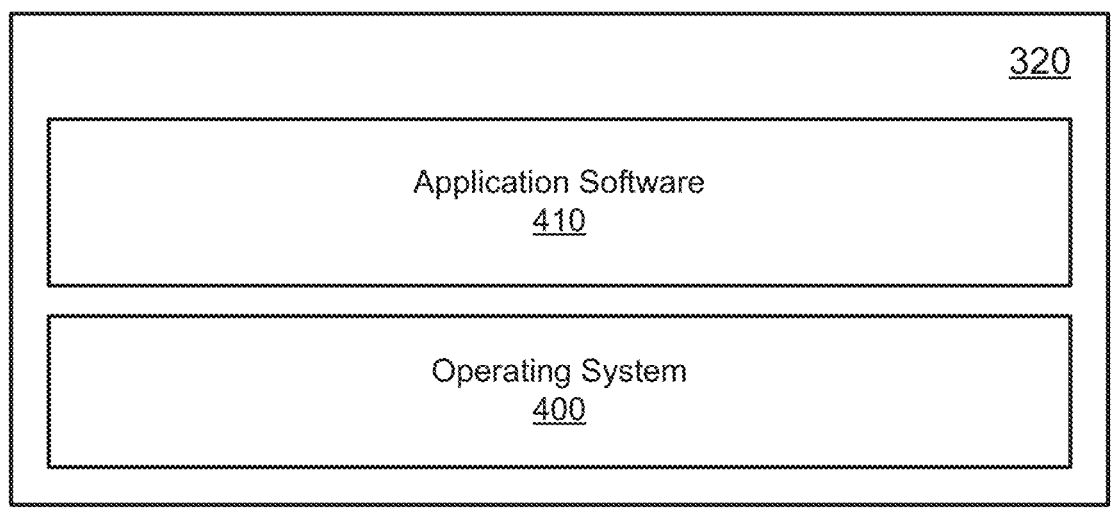
FIG. 4 depicts a simplified software organization exemplary of the example computer system of FIG. 3.

FIG. 4 depicts a simplified organization of software components stored in the memory 320 of the example computing device 300. As illustrated, these software components include an operating system 400 and an application software 410.

The operating system 400 is software. The operating system 400 allows the application software 410 to access the processor 310 (FIG. 6), the memory 320, the I/O module 330, the communications module 340, and the storage module 350 of the example computing device 300. The operating system 400 may be, for example, Google™ Android™, Apple™ iOS™, UNIX™, Linux™, Microsoft™ Windows™, Apple OSX™ or the like.

Where one or more instances of example computing device 300 corresponds to one or more of the first server computer system 130, the second server computer system 150, and/or the mobile computing device 110, the application software 410 may adapt the example computing device 300 to perform one or more functions. For example, the application software 410 may adapt instances of the example computing device 300 to co-operate in the establishment of a trust relationship between the electronic device 100 and the second server computer system 150. Notably, where the example computing device 300 is or corresponds to a mobile device such as, for example, a smartphone or tablet (e.g., where a given instance of the example computing device 300 corresponds to the mobile computing device 110), the application software 410 may itself be or may be a part of a smartphone or tablet application or "app". In a particular example, the application software 410 may correspond to an online banking and/or personal finance app.

By way of overview, the subject matter of the present application may allow a trust relationship to be established between an electronic device such as, for example, the electronic device 100 and a remote computer server system such as, for example, the second server computer system 150. For example, it may be that an OAuth 2.0 JavaScript Object Notation (JSON) Web Signature (JWS) is established linking a user profile/account associated with the electronic device 100 and the first server computer system 130 with a user profile/account associated with the second server computer system 150 and/or the mobile computing device 110 and that a trusted session is established associated therewith.

OAuth 2.0 is described in Internet Engineering Task Force (IETF) Request for Comments (RFC) No. 6749 (and the errata thereto) available from https://tools.ietf.org/html/rfc6749, the contents of which are herein incorporated by reference in their entirety.

JWS is described in IETF RFC No. 7515 available from https://tools.ietf.org/html/rfc7515, the contents of which are herein incorporated by reference in their entirety.

JSON is, for example, described in IETF RFC No. 7159 available from https://tools.ietf.org/html/rfc7159, the contents of which are herein incorporated by reference in their entirety.

Example manners of establishing a trust relationship between the electronic device 100 and the second server computer system 150 will now be discussed with reference to FIGS. 5 and 6.

Figure 5:
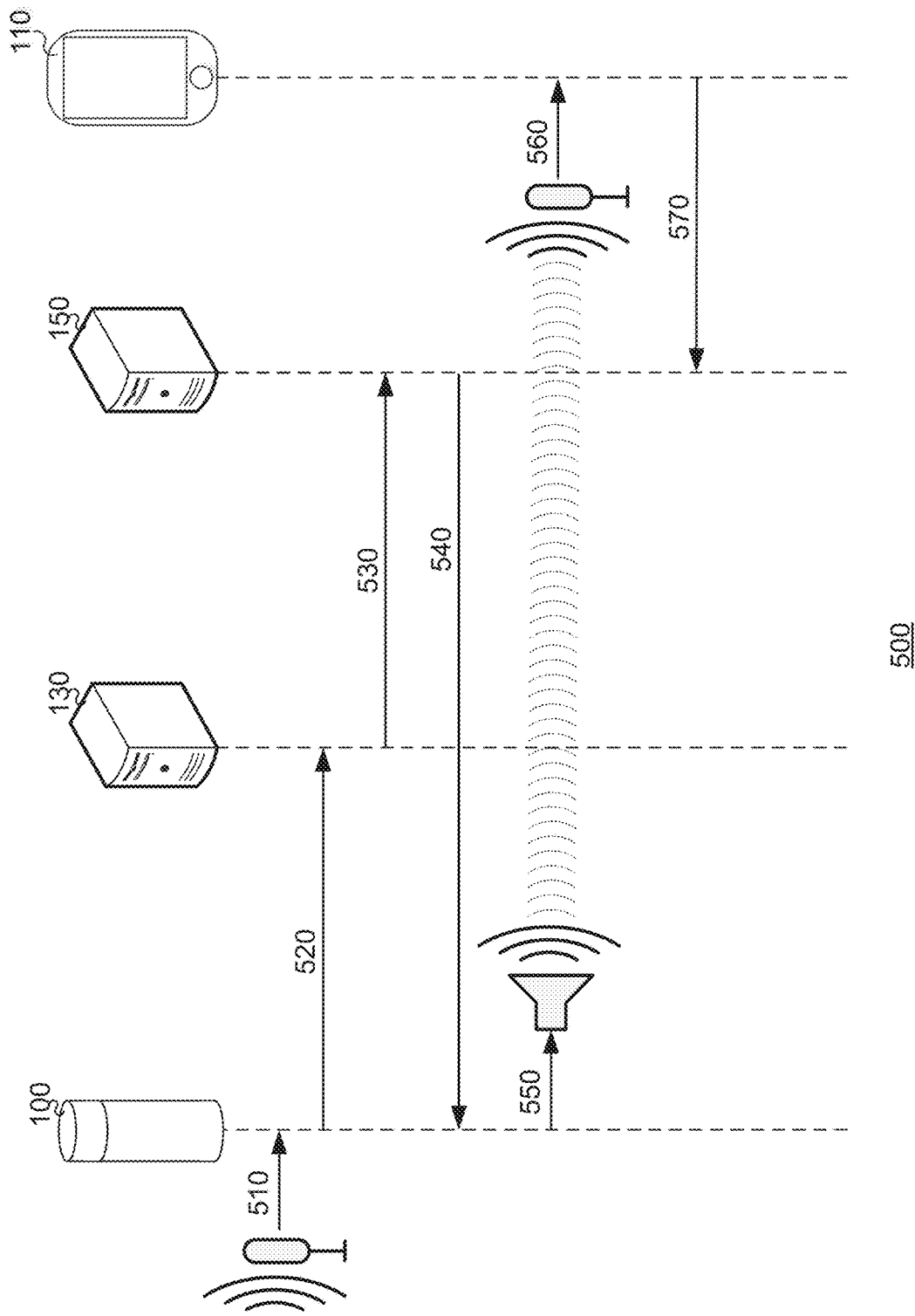
FIG. 5 is a sequence diagram depicting communications between devices in establishing a trusted session between the electronic device and the second computer server system of FIG. 1.

FIG. 5 illustrates a sequence diagram 500 with a format similar to a Unified Modeling Language (UML) sequence showing how data transfers between the electronic device 100, the mobile computing device 110, the first server computer system 130, and the second server computer system 150 may proceed in establishing a trust relationship and a trusted session between the electronic device 100 and the second server computer system 150.

In the following description of the sequence diagram 500, discussion is made of various data transfers being sent and received via computer networks such as, for example, the network 140, the network 160, and/or the network 170. These data transfers may be implemented as messages. However, it may be that some or all of the illustrated messages may not correspond to messages per se when sent over the computer network but may instead be implemented using techniques such as for example remote procedure calls (RPC), web services application program interfaces (APIs), and/or other forms of data transfer such as, for example, file transfers according to one or more of hypertext transport protocol (HTTP), file transfer protocol (FTP), or the like.

By way of overview, the manner of establishing a trust relationship illustrated in the sequence diagram 500 relies on the electronic device 100 and the mobile computing device 110 being sufficiently physically proximate that an audio signal provided by the electronic device 100 may be captured (heard) by the mobile computing device 110.

Referring to the sequence diagram 500, the electronic device 100 may receive a request 510 to initiate a trusted session between the electronic device 100 and the second server computer system 150. For example, the request 510 may be received by way of an audio signal such as may, for example, correspond to a spoken utterance requesting initiation of a trusted session between the electronic device 100 and the second server computer system 150. The electronic device 100 may capture such an audio signal using the microphone 232 by way of the I/O module 230. The utterance may be or may include a command directing the electronic device 100 to initiate a trusted session.

Responsive to the request 510, the electronic device 100 sends an indication 520 of a signal corresponding to the request 510 to the first server computer system 130. The indication 520 may be sent via a network such as, for example, the network 140. For example, the indication 520 may be sent via a network using the communications module 240 (FIG. 2) of the electronic device 100. Where the request 510 corresponds to a spoken utterance, the indication 520 may include an indication of the utterance. For example, the indication 520 may include a waveform corresponding to the utterance as captured by the electronic device 100.

Next, the first server computer system 130 receives the indication 520 from the electronic device 100. The indication 520 is received via a network. For example, the indication 520 may be received via the network 140. In a particular example, where the first server computer system 130 corresponds to an instance of the example computing device 300, the indication 520 may be received using the communications module 340.

The first server computer system 130 may perform processing responsive to the indication 520. For example, where the indication 520 corresponds to an utterance (and potentially includes an indication thereof), the first computer system may determine that an intent associated with that input is a request to establish a secure session between the electronic device 100 and the second server computer system 150.

The first server computer system 130 may send a signal 530 to the second server computer system 150. The signal 530 may be or may include an instruction to initiate a trusted session between the electronic device 100 and the second server computer system 150. As mentioned above, there may be an account or profile associated with the first server computer system 130 and/or the electronic device 100. The aforementioned instruction may include an account linking token for linking the aforementioned account and/or a profile (which may be associated with an account) with a second account associated with the second server computer system 150. Notably, the second account may also be associated with the mobile computing device 110.

The account linking token may take a variety of forms. For example, in some implementations, the account linking token may be an OAuth 2.0 JWS token as mentioned above. Whatever its form, the account linking token may be long-lasting and the token and/or some indication thereof can be passed by the electronic device 100 and/or the first server computer system 130 to the second server computer system 150 in order to access services and functionality provided by the second server computer system 150 once a trusted session has been established between the electronic device 100 and the second server computer system 150. Such a trusted session may be associated with the account linking token as further described below.

Next, the second server computer system 150 receives the signal 530 from the first server computer system 130. The indication 520 is received via a network. For example, the indication 520 may be received via the network 160. In a particular example, where the second server computer system 150 corresponds to an instance of the example computing device 300, the signal 530 may be received using the communications module 340.

Responsive to the signal 530, the second server computer system 150 may evaluate the account linking token to determine whether a secure session has been established between the electronic device 100 and the second server computer system 150. For example, a flag maintained by the second server computer system 150 in association with the account linking token may evaluated. The case where a secure session has already been established is not fully illustrated in the sequence diagram 500. Instead, the sequence diagram 500, illustrates exchanges in the case where such a trusted session is to be established.

Where a trusted session is to be established, the second server computer system 150 generates a session token. The session token may be or may include one or more randomly generated bits. For example, such bits may be generated using a hardware random source and/or using some other pseudorandom source. For example, the bits may be generated using a cryptographically-secure pseudorandom source such as, for example, a cryptographically-secure pseudo random source provided based on instructions executed by a processor of the second server computer system 150 operating on entropy collected from one or more entropy sources. In a particular example, where the second server computer system 150 corresponds to one or more instances of the example computing device 300 (FIG. 3), the generation of the session token may employ a hardware random number generator of the processor 310 and/or a cryptographically-secure pseudorandom source such as, for example, a cryptographically-secure pseudorandom source operating on entropy collected such as, for example, by way of the I/O module 330.

After generating the session token, the second server computer system 150 links that session token with the account linking token. For example, such linking may entail associating the session token with the account linking token in a data structure maintained in a memory and/or other storage (e.g., persisted storage) such as may, for example, be associated with the second server computer system 150.

An indication 540 is then sent by the second server computer system 150 to the electronic device 100. The indication 540 is based on the session token and may include the entirety of the session token or a portion of the session token, depending on the particular implementation.

The indication 540 may be sent by the second server computer system 150 to the electronic device 100 via a network. The indication 540 may be sent via the first server computer system 130. For example, it may be that the second server computer system 150 sends a first indication (not shown) to the first server computer system 130 via a first network and then the first server computer system 130 sends a second indication (not shown) corresponding to the first indication to the electronic device 100 via a second network. The first network may correspond to the network 160 and the second network may correspond to the network 140. Where the second server computer system 150 corresponds to at least one instance of the example computing device 300, the first indication may be sent using the communications module 340 thereof. Similarly, where the first server computer system 130 corresponds to at least one instance of the example computing device 300, the second indication may be sent using the communications module 340 thereof.

As further discussed below, the at least a portion of the session token provided in the indication 540 will be acoustically signalled by the electronic device 100. Accordingly, it may be that the portion (or entirety) of the indication 540 included in the indication 540 is encoded as an audio waveform. Put differently, the indication 540 may include an encoded audio signal indicating the session token or a portion thereof. For example, a pulse-code modulated waveform (e.g., in a WAV file format or in MP3 format (e.g. MPEG-1/2 Audio Layer III format)) encoding the session token or a portion thereof (as the case may be) may be included in the indication 540. Alternatively, data corresponding to the session token or a portion thereof may be included in the indication 540 and the waveform may be generated by the electronic device 100. In another alternative, where the first server computer system 130 acts as an intermediary in conveying the indication 540 to the electronic device 100, the waveform may be generated by the first server computer system 130 responsive to an indication (e.g., the first indication discussed above) received from the second server computer system 150.

As mentioned above, the indication 540 may include the entirety of the session token or only a portion thereof, depending on the particulars of a given implementation of the subject matter of the present applications. For the sake of clarity, an example implementation where the entirety of the session token is sent will be discussed first. Further below, another example implementation where only a portion of the session token is sent will be discussed.

Next, the electronic device 100 receives the indication 540 (directly or indirectly) from the second server computer system 150. The indication 540 may be received via a network using the communications module 240 (FIG. 2). For example, the indication 520 may be received via the network 140.

Next, the electronic device 100 emits an acoustic signal corresponding to the session token as provided by way of the indication 540. Notably, where the indication 540 does not include a waveform, the electronic device 100 may generate such a waveform as a part of and/or prior to the acoustic signal. In any event, the electronic device 100 may acoustically signal the session token using the speaker 234.

In some implementations, the electronic device 100 may acoustically signal the session token ultrasonically or near-ultrasonically. Ultrasonic signalling employs sound waves with frequencies higher than the upper audible limit of typical human hearing (> about 20 kilohertz). Near-ultrasonic signalling employs sound waves with frequencies near the upper audible limit of typical human hearing.

In a particular example, the acoustic signalling may be provided in manners similar to and/or consistent with the Smart Tones™ and/or the Kilo Audio Bit (KAB™) technologies used in protocol implementations provided by LISNR, Inc of Cincinnati, Ohio, USA and Oakland, Calif., USA.

In another particular example, the acoustic signalling may be provided in manners similar to and/or consistent with those employed by ToneTag of Bengaluru, India in making payments using sound signals.

In another particular example, the acoustic signalling may be provided in manners similar to and/or consistent with the SoundTAG technology provided by Perples of South Korea.

As mentioned above, the mobile computing device 110 is sufficiently physically proximate the electronic device 100 to capture acoustic signals therefrom. Accordingly, the mobile computing device 110 may capture an acoustic signal 560 of the session token as signalled by the electronic device 100. Put another way, the acoustic signal 560 captured by the mobile computing device 110 is based on the acoustic signal 550 as signalled by the electronic device 100. The acoustic signal 560 may be captured using one or more microphones. For example, where the mobile computing device 110 corresponds to an instance of the example computing device 300, the acoustic signal 560 may be captured using one or more microphones by way of the I/O module 330. Notably, the acoustic signal 560 and the acoustic signal 550 may vary due to background noise, etc. Suitable encoding including, potentially, the use of error-correcting codes may, however, allow data encoded in the acoustic signal 550 to be extracted from the acoustic signal 560.

In some implementations, the mobile computing device 110 may be triggered to capture the acoustic signal 560 responsive to the acoustic signal 550. For example, it may be that the acoustic signal 550 triggers the mobile computing device 110 to wake and/or to begin capturing the acoustic signal 560. In some cases, the mobile computing device 110 may wake and/or begin capturing responsive to detection of any acoustic signal or an acoustic signal of sufficient volume. In another example, the mobile computing device 110 may detect an indication such as, for example, a preamble or preliminary triggering sound, and upon detecting such an indication may wake and/or begin capturing.

Following capture of the acoustic signal 560, the mobile computing device 110 may extract the session token from the captured acoustic signal (i.e., the acoustic signal 560).

Next, the mobile computing device 110 may send an indication 570 to the second server computer system 150. The indication 570 may be an indication based on identifying information for the mobile computing device 110 and based the session token as reconstructed by the mobile computing device 110 (e.g., as extracted by the mobile computing device 110 from the acoustic signal 560). For example the indication 570 may include one or both of identifying information for the mobile computing device 110 and the session token as reconstructed by the mobile computing device 110.

The identifying information of the mobile computing device 110 may be or may include, for example, a device serial number, an International Mobile Equipment Identity (IMEI) number and/or a Subscriber Identity Module (SIM) card Integrated Circuit Card Identifier (ICCID).

In some implementations, the indication 570 may be or may include an authentication cryptogram. For example, the mobile computing device 110 may generate an authentication cryptogram based on the session token as reconstructed by the mobile computing device 110 and the aforementioned identifying information for the mobile computing device. An authentication cryptogram may be generated in a variety of manners. For example, the cryptogram may be generated using a cryptographic algorithm known to both the mobile computing device 110 and the second server computer system 150 (i.e., a pre-determined encryption algorithm). For example, the triple data encryption standard (3DES) cipher algorithm may be employed in generating the cryptogram. 3DES is defined in, for example, ANSI X9.52-1998 "Triple Data Encryption Algorithm Modes of Operation", the contents of which are herein incorporated by reference in their entirety. In another example, the Advanced Encryption Standard (AES) algorithm may be employed. AES is defined in Federal Information Processing Standards (FIPS) Publication 197, available https://nvlpubs.nist.gov/nistpubs/FIPS/NIST.FIPS.197.pdf, published by the U.S. National Institute of Standards and Technology (NIST) on Nov. 26, 2001, the contents of which are herein incorporated by reference in their entirety. Whatever encryption algorithm(s) are employed, a defined cryptographic key (e.g., a pre-determined encryption key) may be employed in generating the cryptogram. Where the defined cryptographic key is a symmetric key such as, for example, a 3DES key, it may be known to both the mobile computing device 110 and the second server computer system 150. Alternatively, where the defined cryptographic key is an asymmetric key, it may be that the public key is known to one of the mobile computing device 110 and the second server computer system 150 and the private key is known to the other of the mobile computing device 110 and the second server computer system 150. In some implementations, the defined cryptographic key may have been derived for the mobile computing device 110 based on the identifying information. For example, the second server computer system 150 may derive the pre-defined key based on a master key and the identifying information.

It may be that the cryptogram is generated in manners similar to and/or consistent with generation of EMV cryptograms. EMV cryptogram generation is described in EMV 4.1, Book 2 Session and Key Management, (May 2004), the contents of which are incorporated herein by reference in their entirety.

Next, the second server computer system 150 receives the indication 570 from the electronic device 100. The indication 570 is received via a network. For example, the indication 570 may be received via the network 170. In a particular example, where the second server computer system 150 corresponds to an instance of the example computing device 300, the indication 570 may be received using the communications module 340.

Responsive to receiving the indication 570, the second server computer system 150 confirms that the indication 570 corresponds to the session token and that the indication 570 (e.g., identifying information reflected in the indication 570) corresponds to a mobile computing device associated with the account associated with the second server computer system 150 (e.g., the mobile computing device 110).

Confirming that the indication 570 corresponds to the session token and to a mobile computing device associated with the account associated with the second server computer system 150 may take a variety of forms. For example, where the indication 570 is or includes an authentication cryptogram as discussed above, the second server computer system 150 may validate the cryptogram.

Validating a cryptogram may take a variety of forms depending on the form of the cryptogram and the manner of generation thereof. The pre-defined key may be employed in validating the cryptogram. The pre-defined key may be identified based on the account linking token. For example, it may be that the second server computer system 150 retrieves the pre-defined key (or a corresponding key if the pre-defined key of the mobile computing device 110 is an asymmetric key) (e.g., based on the account linking token) for use in validating the cryptogram. In another example, the second server computer system 150 may derive the key based on a master key (which may itself be retrieved based on, for example, the account linking token) and the identifying information for the mobile device. For example, the mobile phone identifying information may be included in the indication 570. Notably, where this is the case, the second server computer system 150 may validate the identifying information such as, for example, by verifying that it matches a value maintained by the second server computer system 150 in association with the account linking token. A cryptogram generated in manners consistent with/similar to an EMV cryptogram may be verified/validated in manners consistent with/similar to those employed for EMV cryptograms as described in EMV 4.1, Book 2 Session and Key Management, (May 2004) cited above.

In a particular example, of validating a cryptogram, the second server computer system 150 may retrieve or derive the pre-defined key (i.e., where the pre-defined key discussed above is a symmetric key) and may then use the session token (as known to the second server computer system 150), the identifying information for the mobile computing device 110 (however obtained) and the key to generate a cryptogram. Such a cryptogram may, for example, be generated in manners similar to/consistent with generation of an EMV cryptogram. Regardless, the second server computer system 150 may validate the cryptogram received by way of the indication 570 by comparing it with a cryptogram it generated to see if they match.

However confirmed, responsive to confirming that the indication corresponds to the session token and to a mobile computing device associated with the account associated with the second server computer system 150, a trusted session between the electronic device 100 and the second server computer system 150 is established. Notably, the second server computer system 150 may perform suitable record keeping to note the establishment of the trusted session. For example, it may be that a flag maintained in association with the account linking token is set to a value indicating that a trusted session has been established.

The other example implementation where only a portion of the session token is sent by way of the indication 540 will now be discussed.

In including a portion of the session token in the indication 540, the session token may be split into two parts (which may or may not be of equal size). A first one of the two portions may then be the portion of the session token included in the indication 540. The other of the two portions may be sent by the second server computer system 150 to the mobile computing device 110 such as, for example, by way of the network 170.

In such an implementation, the handling of the indication 540 by the electronic device 100 is unchanged except it will acoustically signal only the first portion of the session token in the acoustic signal 550. Similarly, the acoustic signal 560 as captured by the mobile computing device 110 will also correspond to the first portion of the session token. As such, the mobile computing device 110 may extract the first portion of the session token from the acoustic signal 560.

In such an implementation, after capturing the acoustic signal 560, the mobile computing device 110 may reconstruct the session token based not only on the portion of the session token that can be extracted from the acoustic signal 560 (i.e., the first portion) but also on the other portion of the session token as received by the mobile computing device 110 from the second server computer system 150. Put another way, the mobile computing device 110 may reassemble the session token by combining the first portion extract from the acoustic signal 560 with the second portion received from the second server computer system 150.

In such an implementation, the indication 570 may include the session token as reconstructed (i.e., as reassembled by the mobile computing device 110 based on the portion extracted from the acoustic signal 560 and the portion received separately from the second server computer system 150). Additionally, the indication 570 may include identifying information for the mobile computing device 110 such as, of the sort discussed above.

In such an implementation, validation of the indication 570 by the second server computer system 150 may involve confirming that the session token as provided therein (e.g., as reconstructed by the mobile computing device 110) matches the session token as originally generated by the second server computer system 150. Additionally, validation may confirm that the mobile computing device 110 is a mobile computing device associated with the account associated with the second server computer system 150 by confirming that identifying information for the mobile computing device 110 included in the indication 570 matches identifying information for a known device associated with that account. For example, it could be that the second server computer system 150 compares the identifying information included in the indication 570 to identifying information for mobile devices associated with the account maintained by the second server computer system 150 in association with the account linking token. As above, following confirmation that the acoustic signal 550 corresponds to the session token and to a mobile computing device associated with the account, a trusted session is established by the second server computer system 150 between the electronic device 100 and the second server computer system 150.

Figure 6:
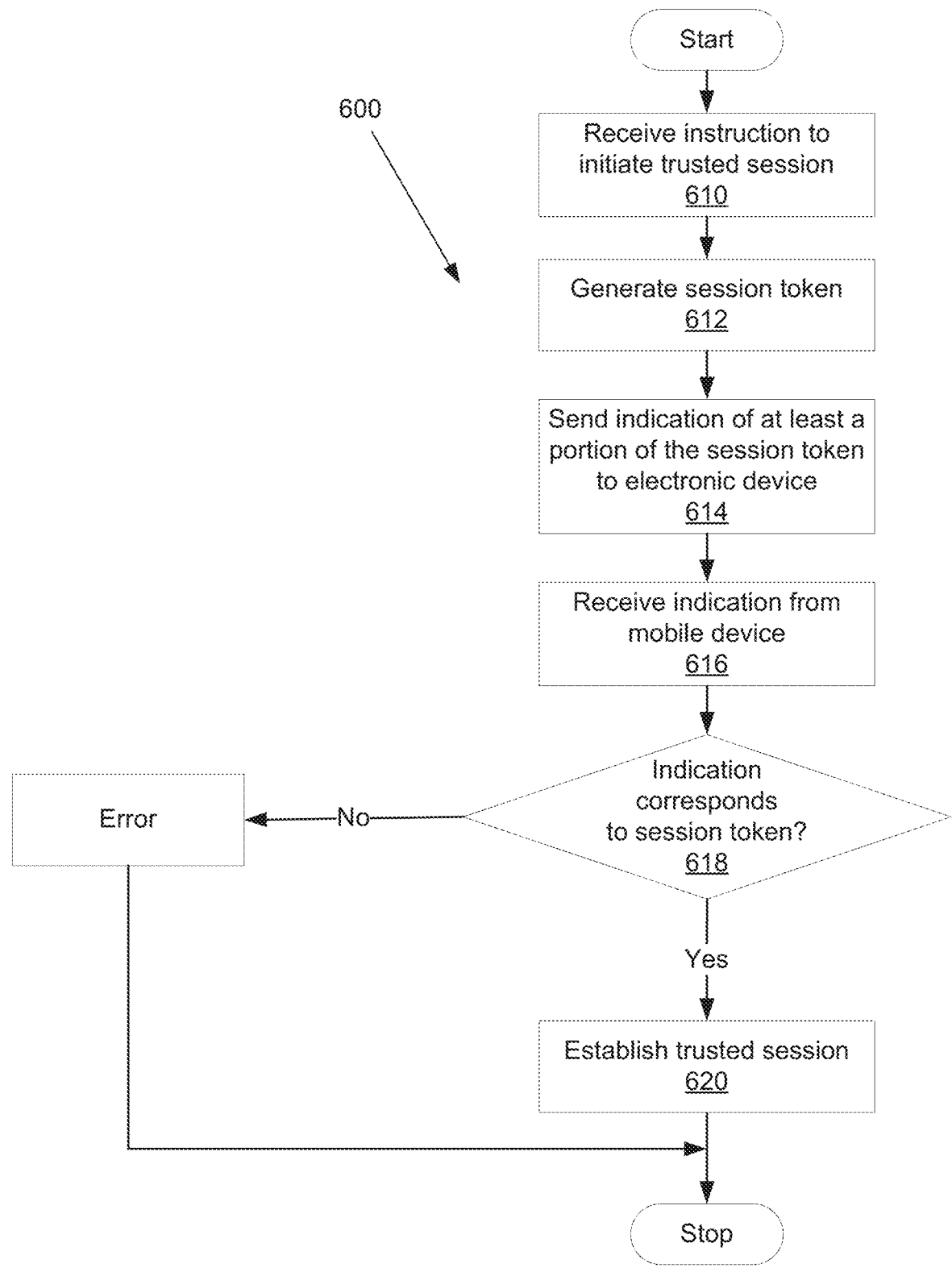
FIG. 6 is a flowchart depicting example operations performed by the second computer server system of FIG. 1 in establishing a trusted session with the electronic device of FIG. 1.

Operations performed by the second server computer system 150 in establishing a trusted session between the electronic device 100 and the second server computer system 150 are summarized in the flowchart of FIG. 6 which illustrates a method 600 for establishing trusted sessions. In performing the method 600, operations starting from an operation 610 and continuing onward are performed by a processor of the second server computer system 150 executing software. For example, where the second server computer system 150 is or includes at least one instance of the example computing device 300, the operations may be performed by the processor 310 executing instructions of a suitable instance of the application software 410 (FIG. 4).

At the operation 610, the second server computer system 150 receives an instruction to initiate a trusted session. The instruction corresponds to the signal 530 discussed above. The instruction may be received from the first server computer system 130. The instruction may include an account linking token for linking an account associated with the electronic device 100 and the first server computer system 130 with an account associated with the second server computer system 150.

Following the operation 610, an operation 612 is next.

At the operation 612, a session token is generated by the second server computer system 150 as discussed above in relation to the discussion of processing performed by the second server computer system 150 responsive to receipt of the signal 530.

Following the operation 612, an operation 614 is next. At the operation 614, an indication corresponding to the indication 540 is sent by the second server computer system 150 to the electronic device 100. As discussed above in relation to the indication 540, the indication includes at least a portion of the session token generated at the operation 612.

Following the operation 614, an operation 616 is next.

At the operation 616, an indication corresponding to the indication 570 is received by the second server computer system 150 from the mobile computing device 110. As discussed above in relation to the indication 570, the indication is an indication of the identifying information for the mobile computing device and of the session token.

Following the operation 616, an operation 618 is next.

At the operation 618, it is determined whether the indication received at the operation 616 corresponds to the session token. Such a determination may be made in manners as discussed above in relation to the description of processing by the second server computer system 150 responsive to the indication 570. As discussed above, the second server computer system 150 may, as a part of such determination, also determine whether identifying information for the mobile device corresponds to a mobile computing device associated with an account associated with the second server computer system 150.

If is determined that the indication corresponds to the session token (and to a mobile computing device associated with an account associated with the second server computer system 150), an operation 620 is next. If not, an error is detected and the attempt to establish a trusted session between the electronic device 100 and the second server computer system 150 has failed.

At the operation 620, the trusted session is established. As discussed above, this may involve manipulation of a data structure by the second server computer system 150. Such a data structure may be stored in memory and/or persisted storage. As an example of manipulation of a data structure, the second server computer system 150 may set a flag maintained in association with the account linking token to a value indicating that a trusted session has been established.

Following the establishment of the trusted relationship between the electronic device 100 and the second server computer system 150, the electronic device 100 and the second server computer system 150 may interact in manners requiring such trust such as, for example, for security and/or to protect privacy. For example, the electronic device 100 may provide one or more services reliant on services provided by the second server computer system 150.

In a particular example, the electronic device 100 and the first server computer system 130 may cooperate to provide a banking application related to one or more financial institution accounts. The second server computer system 150 may be a server providing access to information related to those accounts. For example, the second server computer system 150 may be and/or may provide access to one or more servers associated with the financial institution.

Whatever the nature of the service provided by the electronic device 100 and the first server computer system 130 in co-operation with the second server computer system 150, the first server computer system 130 may, once a secure session is established, pass the account linking token when making requests (e.g., webservices API calls) to the second server computer system 150. The second server computer system 150 may then validate that a secure session exists based on the first server computer system 130. For example, the second server computer system 150 may use the account linking token as an index to access a flag associated therewith, that flag indicating whether or not a secure session exists between the electronic device 100 and the second server computer system 150 as discussed above. The second server computer system 150 may also use the account linking token to identify an associated account and to then provide a reply to a request. For example, where the service provided is a banking application, the second server computer system 150 may use the account linking token to identify a banking account and/or profile to access information and/or perform operations related thereto. In a particular example, the second server computer system 150 could retrieve a bank balance for an account responsive to a request received by the second server computer system 150 from the first server computer system 130 responsive to a request (e.g., as may correspond to a spoken utterance received at the electronic device 100 such as, for example, "what's my bank balance?").

In some implementations, provision may be made for ending a trusted session. For example, it may be that trusted sessions time out. Additionally or alternatively, a trusted session may be terminated based on a request from the electronic device 100 (e.g., due to a detected condition and/or responsive to a spoken utterance to end the session), the first server computer system 130 and/or at the initiation of the second server computer system 150 (e.g., due to a detected condition). Responsive to a request to end a trusted session and/or having initiated the end of the trusted session itself, the second server computer system 150 may perform appropriate bookkeeping. For example, where a flag is maintained by the second server computer system 150 in association with the account linking token, the flag may be set to a value indicating that a trusted session has not been established.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer server system comprising:
a processor;
a communications module coupled to the processor;
a memory coupled to the processor and storing instructions that, when executed by the processor, cause the computer server system to:
receive, using the communications module, an instruction to initiate a trusted session between a first electronic device and the computer server system, the instruction including an indication of an account linking token, the account linking token for linking a first account associated with the first electronic device with a second account associated with the computer server system;
generate, by the processor using at least one of a pseudorandom source and a random source, a session token;
send, to the first electronic device using the communications module, an indication of at least a portion of the session token, wherein the first electronic device is configured to acoustically signal the at least a portion of the session token;
receive, by the computer server system using the communications module from a mobile computing device physically proximate the first electronic device, an indication based on identifying information for the mobile computing device and on the session token as reconstructed by the mobile computing device based on an acoustic signal of the at least a portion of the session token as signalled by the first electronic device and captured by the mobile computing device;
responsive to receiving the indication of the identifying information for the mobile computing device and of the session token as reconstructed by the mobile computing device, confirm, by the processor, that the indication corresponds to the session token and to the mobile computing device associated with the second account; and
responsive to confirming that the indication corresponds to the session token and to the mobile computing device associated with the second account, establishing the trusted session between the first electronic device and the computer server system.

2. The computer server system of claim 1, wherein the session token is divided into a first portion and a second portion and wherein the at least a portion of the session token is the first portion of the session token, and wherein the instructions, when executed by the processor, further cause the computer server system to:
send, to the mobile computing device using the communications module, an indication of the second portion of the session token, wherein the mobile computing device reconstructs the session token by combining the second portion of the session token with at least a portion of the session token as reconstructed by the mobile computing device to yield the session token.

3. The computer server system of claim 1, wherein the at least a portion of the session token sent to the first electronic device includes the entirety of the session token.

4. The computer server system of claim 1, wherein the indication based on identifying information for the mobile computing device and on the session token as reconstructed by the mobile computing device includes an authentication cryptogram generated by the mobile computing device based on the session token as reconstructed by the mobile computing device and the identifying information for the mobile computing device, and wherein confirming that the indication corresponds to the session token and to the mobile computing device associated with the second account includes verifying the authentication cryptogram.

5. The computer server system of claim 4, wherein the authentication cryptogram is generated and verified using a pre-determined encryption algorithm and based on a pre-determined encryption key, and wherein the pre-determined encryption key is associated with the account linking token, and wherein confirming, by the computer server system, that the indication corresponds to the session token and to the mobile computing device associated with the second account further includes identifying the pre-determined encryption key based on the account linking token.

6. The computer server system of claim 5, wherein the pre-determined encryption algorithm is Triple Data Encryption Standard (3 DES).

7. The computer server system of claim 1, wherein the at least a portion of the session token is acoustically signalled by the first electronic device ultrasonically.

8. The computer server system of claim 1, wherein the indication of at least a portion of the session token includes an encoded audio signal indicating the at least a portion of the session token.

9. A computer-implemented method comprising:
receiving, by a computer server system, an instruction to initiate a trusted session between a first electronic device and the computer server system, the instruction including an indication of an account linking token, the account linking token for linking a first account associated with the first electronic device with a second account associated with the computer server system;
generating, by the computer server system using at least one of a pseudorandom source and a random source, a session token;

sending, by the computer server system to the first electronic device, an indication of at least a portion of the session token, wherein the first electronic device is configured to acoustically signal the at least a portion of the session token;

receiving, by the computer server system from a mobile computing device physically proximate the first electronic device, an indication based on identifying information for the mobile computing device and on the session token as reconstructed by the mobile computing device based on an acoustic signal of the at least a portion of the session token as signalled by the first electronic device and captured by the mobile computing device;

responsive to receiving the indication of the identifying information for the mobile computing device and of the session token as reconstructed by the mobile computing device, confirming, by the computer server system, that the indication corresponds to the session token and to the mobile computing device associated with the second account; and responsive to confirming that the indication corresponds to the session token and to the mobile computing device associated with the second account, establishing the trusted session between the first electronic device and the computer server system.

10. The method of claim 9, wherein the session token is divided into a first portion and a second portion and wherein the at least a portion of the session token is the first portion of the session token, and wherein the method further comprises:

sending, by the computer server system to the mobile computing device, an indication of the second portion of the session token, wherein the mobile computing device reconstructs the session token by combining the second portion of the session token with at least a portion of the session token as reconstructed by the mobile computing device to yield the session token.

11. The method of claim 9, wherein the at least a portion of the session token sent to the first electronic device includes the entirety of the session token.

12. The method of claim 9, wherein the indication based on identifying information for the mobile computing device and on the session token as reconstructed by the mobile computing device includes an authentication cryptogram generated by the mobile computing device based on the session token as reconstructed by the mobile computing device and the identifying information for the mobile computing device, and wherein confirming, by the computer server system, that the indication corresponds to the session token and to the mobile computing device associated with the second account includes verifying the authentication cryptogram.

13. The method of claim 12, wherein the authentication cryptogram is generated and verified using a pre-determined encryption algorithm and based on a pre-determined encryption key, and wherein the pre-determined encryption key is associated with the account linking token, and wherein confirming, by the computer server system, that the indication corresponds to the session token and to the mobile computing device associated with the second account further includes identifying, by the computer server system, the pre-determined encryption key based on the account linking token.

14. The method of claim 13, wherein the pre-determined encryption algorithm is Triple Data Encryption Standard (3 DES).

15. The method of claim 9, wherein the at least a portion of the session token is acoustically signalled by the first electronic device ultrasonically.

16. The method of claim 9, wherein the indication of at least a portion of the session token includes an encoded audio signal indicating the at least a portion of the session token.

17. A non-transitory computer-readable medium storing instructions that, when executed by a processor of a computer system, cause the computer system to:

receive an instruction to initiate a trusted session between a first electronic device and the computer-readable medium, the instruction including an indication of an account linking token, the account linking token for linking a first account associated with the first electronic device with a second account associated with the computer system;

generate, using at least one of a pseudorandom source and a random source, a session token;

send, to the first electronic device, an indication of at least a portion of the session token, wherein the first electronic device is configured to acoustically signal the at least a portion of the session token;

receive, by the computer system from a mobile computing device physically proximate the first electronic device, an indication based on identifying information for the mobile computing device and on the session token as reconstructed by the mobile computing device based on an acoustic signal of the at least a portion of the session token as signalled by the first electronic device and captured by the mobile computing device;

responsive to receiving the indication of the identifying information for the mobile computing device and of the session token as reconstructed by the mobile computing device, confirm that the indication corresponds to the session token and to the mobile computing device associated with the second account; and responsive to confirming that the indication corresponds to the session token and to the mobile computing device associated with the second account, establishing the trusted session between the first electronic device and the computer system.

18. The computer-readable medium of claim 17, wherein the session token is divided into a first portion and a second portion and wherein the at least a portion of the session token is the first portion of the session token, and wherein the instructions, when executed by the processor, further cause the computer system to:

send, to the mobile computing device, an indication of the second portion of the session token, wherein the mobile computing device reconstructs the session token by combining the second portion of the session token with at least a portion of the session token as reconstructed to yield the session token.

19. The computer-readable medium of claim 17, wherein the at least a portion of the session token sent to the first electronic device includes the entirety of the session token.

20. The computer-readable medium of claim 17, wherein the indication based on identifying information for the mobile computing device and on the session token as reconstructed by the mobile computing device includes an authentication cryptogram generated by the mobile computing device based on the session token as reconstructed by the mobile computing device and the identifying information for the mobile computing device, and wherein confirming that the indication corresponds to the session token and to the mobile computing device associated with the second account includes verifying the authentication cryptogram.

* * * * *